United States Patent [19]
Tanaka et al.

[11] Patent Number: 6,045,041
[45] Date of Patent: Apr. 4, 2000

[54] CASSETTE MANAGING SYSTEM

[75] Inventors: Shosuke Tanaka; Mitsutaka Enomoto; Teruyuki Yoshida, all of Kanagawa, Japan

[73] Assignee: Sony Corporation, Tokyo, Japan

[21] Appl. No.: 08/989,645

[22] Filed: Dec. 12, 1997

[30] Foreign Application Priority Data

Dec. 16, 1996 [JP] Japan ..................................... 8-335894

[51] Int. Cl.⁷ .................................................. G06K 15/00
[52] U.S. Cl. ............................................. 235/383; 369/36
[58] Field of Search .................................. 235/383, 385; 369/30, 37, 36

[56] References Cited

U.S. PATENT DOCUMENTS

| | | | |
|---|---|---|---|
| 4,839,875 | 6/1989 | Kuriyama et al. .................. | 235/385 X |
| 5,303,214 | 4/1994 | Kulakowski et al. .............. | 235/385 X |
| 5,323,327 | 6/1994 | Carmichael et al. ............... | 235/383 X |
| 5,661,287 | 8/1997 | Schaefer et al. ........................ | 235/383 |

*Primary Examiner*—Karl D. Frech
*Attorney, Agent, or Firm*—Jay H. Maioli

[57] ABSTRACT

Cassette managing data is read or written with a cassette accommodated in its bin. Cassettes 2a, 2b, 2c, and so on are attached at particular positions thereof to IC cards 1a, 1b, 1c, and so on respectively. Cassette bins 4a, 4b, 4c, and so on have read/write devices 3a, 3b, 3c and so on respectively at positions communicable with the IC cards. Control information of each cassette is read with the cassette accommodated in its bin from the read/write device and the read control information is controlled by a control server 5 via a LAN 9a. A robotics unit 8 is controlled by the control server 5 via a LAN 9c to move cassettes to the bins 4a, 4b, 4c, and so on or an image and/or sound information input/output block 7.

5 Claims, 7 Drawing Sheets

| SYSTEM NAME | ---- | INDIVIDUAL NUMBER | |
|---|---|---|---|
| NEW ARCHIVE | ---- | 67890005125ASHI | |
| CASSETTE ID | | | |

| INDEX | TITLE 1 | ... | TITLE N |
|---|---|---|---|
| TITLE NAME | AIRCRAFT ACCIDENTS | ... | ... |
| COMPRESSION METHOD | MPEG-2 | ... | ... |
| DATA QUANTITY | 12 MB | ... | ... |
| TITLE IMAGE |  | ... | ... |
| START ADDRESS | 0000100000 | ... | ... |
| END ADDRESS | 0098765400 | ... | ... |

CASSETTE MANAGING SYSTEM

BACKGROUND OF THE INVENTION

The present invention generally relates to a cassette managing system and, more particularly, to a cassette managing system for managing cassettes for recording image information and/or sound information.

In a ordinary cassette managing system for managing an large number of cassette tapes, an individual cassette tape is accommodated in a cassette accommodating case (hereafter referred to as a bin) that stores one unit of cassette tape. When moving cassette tapes from a large number of bins to a recording and reproducing apparatus or returning cassette tapes from the recording and reproducing apparatus to the cassette bins, a robotics unit is used for automating these processes. The robotics unit has a controller and a hard disk that stores managing information about cassette tapes under the control of the cassette managing system, namely, the positions of bins accommodating the cassettes, contents recorded on the cassette tapes, and IDs of the cassette. When a processing request comes, the robotics unit moves cassette tapes based on this managing information.

However, if the power to the system is interrupted or a change occurs in the cassette tape content, the above-mentioned cassette managing system must be initialized. In the initialization, the robotics unit accesses all bins and reads the ID (Identification) data of the cassette tape housed in each bin by a bar code or the like, and matches the read ID data with the data stored on the hard disk. Therefore, the initialization takes time.

For the method of mechanically reading the ID data from cassette tapes, a method of attaching bar codes recording ID data to cassette tapes is conventionally used. However, unless a cassette tape is taken from its bin, the tape data recorded on the bar code cannot be read. This operation of taking the cassette tape from its bin and returning the cassette tape into the bin makes the initialization time still longer.

Further, a bar code can handle only a small amount of data. Therefore, it is substantially impossible to make a bar code record data other than the ID of the cassette tape. This requires storing all managing information of a cassette tape into the hard disk of the robotics unit. A plurality of robotics units may be provided on a single cassette managing system, thereby presenting the problems that a hard disk of a very large storage capacity must be used and the security of the data stored on such a hard disk must be considered.

Since the information (position and so on) associated with the bins is closely related to the information associated with the cassette tapes housed in the bins, a cassette tape taken out of its bin for reproduction or the like must always be returned into its bin. This makes it impracticable to arrange often taken-out cassette tapes together into nearby bins, thereby preventing cassette tape handling from being streamlined.

SUMMARY OF THE INVENTION

It is therefore an object of the present invention to provide a cassette managing system that performs a data read/write operation on a cassette housed in its bin without touching an IC (Integrated Circuit) card storing control data of the cassette and provides the bin with a read/write device connected to a control server, thereby allowing a control data read/write operation with the cassette kept housed in its bin.

It is another object of the present invention to provide a cassette managing system that does not require a hard disk on a robotics unit because cassette control data is stored in an IC card attached on each cassette.

It is still another object of the present invention to provide a cassette managing system that separately controls cassette managing information and bin information, thereby allowing arbitrary change of bins in which cassettes are housed.

In carrying out the invention and according to one aspect thereof, there is provided a cassette managing system for managing cassettes for recording image and/or sound information, comprising: a bin that is capable of accommodating a cassette attached at a card attaching position thereof with an IC card having an information storage area, such bin having a read/write device for reading data from the above-mentioned IC card and writing data to the above-mentioned IC card without touching the above-mentioned IC card with the above-mentioned cassette accommodated in the above-mentioned bin; a control server that generates a system control data based on data read from the above-mentioned IC card by the above-mentioned read/write device and, upon receiving a request for processing the above-mentioned cassette accommodated in the above-mentioned bin, generates a control directive from the above-mentioned system control data and the above-mentioned request for processing and outputs the generated control directive; an image and/or sound information input/output means that, when the above-mentioned cassette is set, reproduces image and/or sound information from the above-mentioned cassette and records image and/or sound information onto the above-mentioned cassette according to the above-mentioned control directive; and a robotics unit that selects the above-mentioned cassette according to the above-mentioned control directive and moves the selected cassette to the above-mentioned bin or the above-mentioned image and/or sound information input/output means.

In such a cassette managing system as mentioned above, the IC card having a storage area is attached to each image and/or sound information recording cassette to be managed. The read/write device performs data reading from the IC card and data writing thereto without touching the same. The bin is capable of accommodating a cassette. When the cassette is accommodated, the read/write device comes to a position facing the IC card attaching position. The control server generates system control data based on the data read from the IC card by the read/write device. Upon reception of a request for processing the cassette accommodated in the bin, the control server generates a control directive from the system control data and the processing request and outputs the generated control directive. The image and/or sound information input/output means, when the cassette is set, reproduces image and/or sound information from the cassette and records image and/or sound information onto the cassette according to the control directive. Then, the robotics unit selects the cassette and moves the cassette to the bin from the image and/or sound input/output means.

The above-mentioned cassette managing system allows reading of data from the IC card attached to each cassette and writing of data thereto with the cassette accommodated in the bin. Therefore, storing control data for the cassette on which the IC card is attached into the same eliminates the necessity for acquiring the cassette ID by taking the cassette from its bin, thereby speeding up the initialization processing.

In addition, storing the control data into the IC card makes it unnecessary for the robotics unit to have a hard disk of its own.

Further, the cassette control data and the bin data are controlled separately, so that bins for accommodating a particular cassette can be changed as required.

BRIEF DESCRIPTION OF THE DRAWINGS

These and other objects of the invention will be seen by reference to the description, taken in connection with the accompanying drawing, in which.

DETAILED DESCRIPTION OF PREFERRED EMBODIMENTS

This invention will be described in further detail by way of example with reference to the accompanying drawings.

Figure 1:
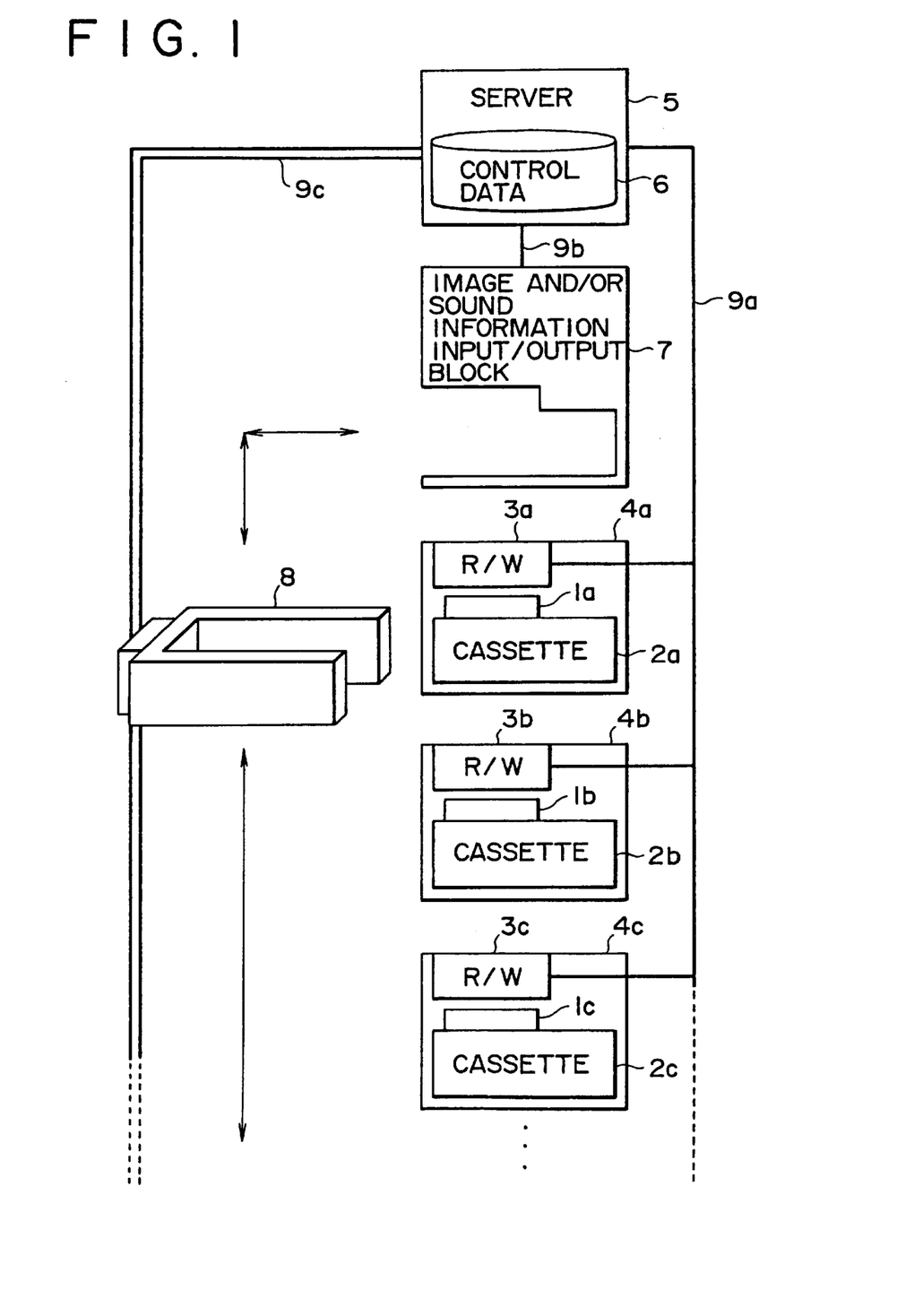
FIG. 1 is a schematic diagram illustrating a principal constitution of the present invention.

Now, referring to FIG. 1, there is shown a schematic diagram illustrating a principal constitution of a cassette managing system according to the present invention practiced as one preferred embodiment thereof.

The cassette managing system according to the present invention is composed of cassettes 2a, 2b, 2c, and so on attached with IC cards 1a, 1b, 1c, and so on respectively, bins 4a, 4b, 4c, and so on having read/write (R/W) devices 3a, 3b, 3c, and so on respectively, a control server 5 having a control data holding block 6, an image and/or sound information input/output block 7, a robotics unit 8, and LANs 9a, 9b, and 9c.

The IC cards 1a, 1b, 1c, and so on have a mass storage capacity each. The cassettes 2a, 2b, 2c, and so on are recorded with image and/or sound information each. Each cassette is attached with the IC card at the same position, in which control data associated with the image and/or sound information recorded in each cassette is stored.

The read/write devices 3a, 3b, 3c and so on read data from the corresponding IC cards and write data thereto without touching the same.

The bins 4a, 4b, 4c, and so on are formed so that each bin accommodates one cassette and has a unique ID. With the cassettes 2a, 2b, 2c and so on accommodated, the bins have the read/write devices 3a, 3b, 3c, and so on at positions facing the IC cards 1a, 1b, 1c, and so on respectively attached on the corresponding accommodated cassettes. It should be noted that a communication side of each of the read/write devices 3a, 3b, 3c, and so on is wider than the communication side of each IC card, so that communication is enabled as long as the cassette is accommodated in its bin.

The control server 5 generates system control data by providing a relationship between the control data of the cassettes 2a, 2b, 2c, and so on read from the IC cards 1a, 1b, 1c, and so on by the read/write devices 3a, 3b, 3c, and so on respectively and the IDs of the read/write devices 3a, 3b, 3c, and so on respectively. Then, when a request for processing any of the cassettes 2a, 2b, 2c, and so on comes, the control server 5 generates a control directive from this system control data and the processing request and outputs the generated control directive.

The control data holding block 6 holds the system control data generated by the control server 5.

To the image and/or sound information input/output block 7, one or more of the cassettes 2a, 2b, 2c, and so on are set. When one or more cassettes are set and the control directive comes from the control server 5, the image and/or sound information input/output block 7 performs an image and/or sound information input/output operation on one or more cassettes set. An internal constitution and so on of this image and/or sound information input/output block 7 will be described later.

The robotics unit 8, based on the control directive coming from the control server 5, moves the cassettes 2a, 2b, 2c, and so on between the bins 4a, 4b, 4c, and so on and the image and/or sound information input/output block 7.

The LAN 9a connects the control server 5 to the read/write devices 3a, 3b, 3c, and so on, the LAN 9b connects the control server 5 to the image and/or sound information input/output block 7, and the LAN 9c connects the control server 5 to the robotics unit 8.

The following describes the flow of the processing to be performed when the cassettes 2a, 2b, 2c, and so on are managed in the above-mentioned cassette managing system.

Figures 2, 2A:
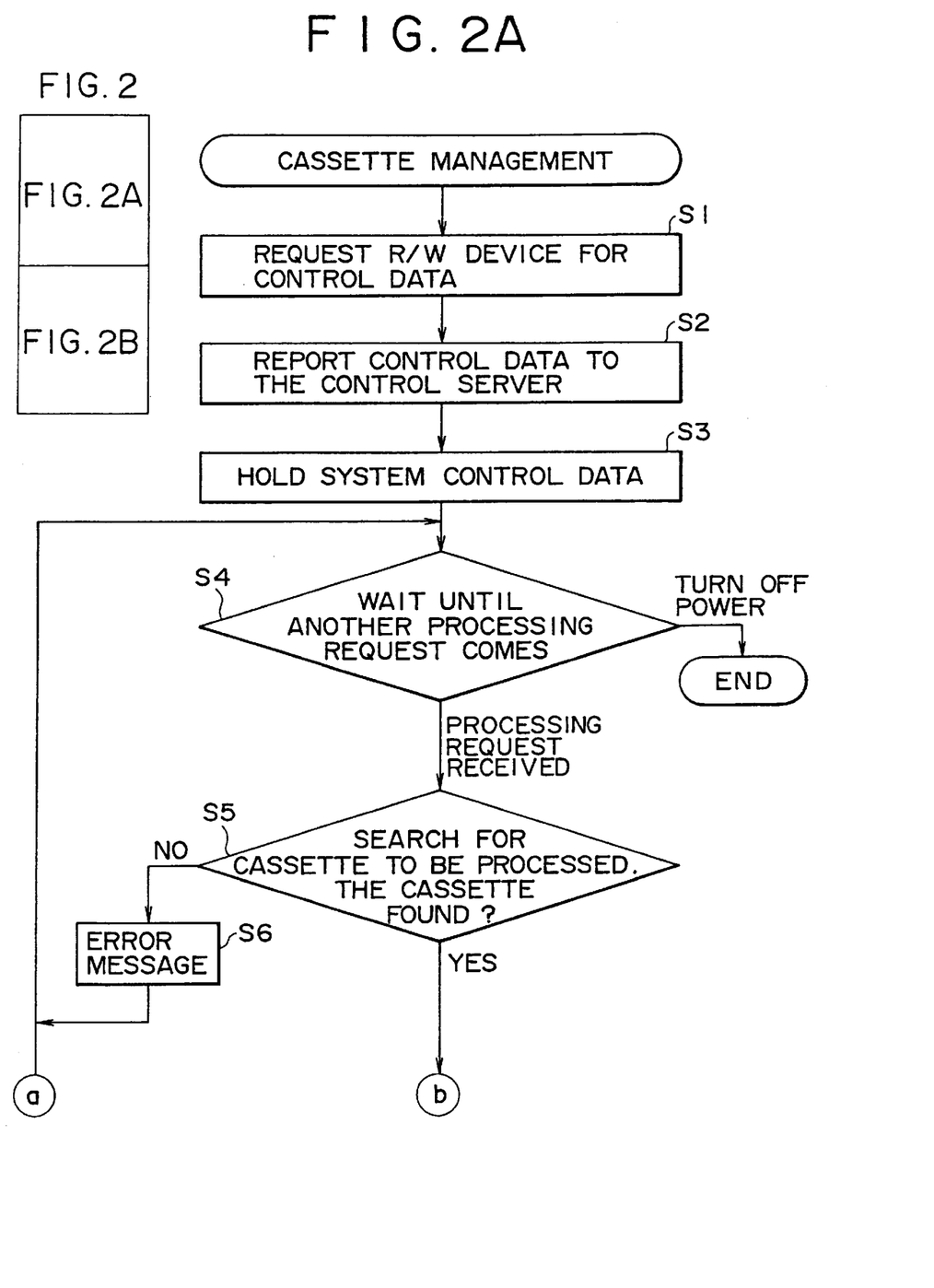
FIGS. 2a and 2b are a flowchart indicating a procedure of various processes for managing cassettes by a cassette managing system according to the present invention.
Figure 2B:
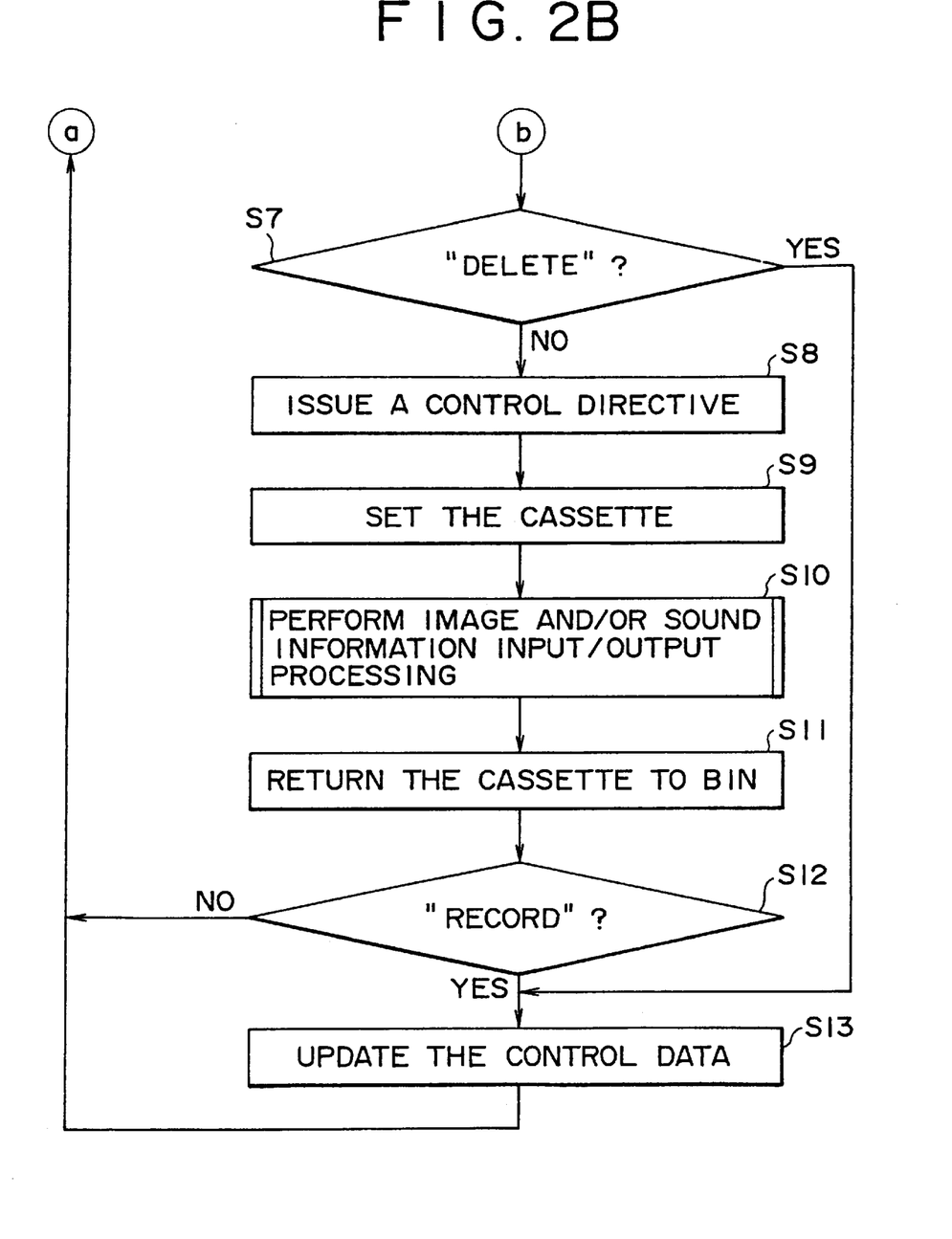

Now referring to FIG. 2, there is shown a flowchart indicating a procedure of various processing for managing cassettes in the cassette managing system according to the present invention.

When managing the cassettes 2a, 2b, 2c, and so on, first the control server 5 requests the read/write devices 3a, 3b, 3c, and so on for control data via the LAN 9a (step S1). The requested read/write devices 3a, 3b, 3c, and so on check the corresponding bins for cassettes. If the cassettes are found accommodated in the bins, the read/write devices read the control data from the cassettes and pass the read data to the controller server 5 via the LAN 9a. If no cassette is found accommodated, the read/write devices send an error message "Cassette not accommodated" to the control server 5 via the LAN 9a (step S2). At this moment, the ID of each bin is also sent to the control server 5. From the control data reported from the read/write devices 3a, 3b, 3c, and so on and the IDs of the bins 4a, 4b, 4c, and so on, the control server 5 generates system control data and stores the generated data into the control data holding block 6 (step S3). Then, when responses for the control data come from all the read/write devices, the control server 5 enters into a wait state until some processing request comes (step S4). It should be noted that, if the power to the system is interrupted while the control server 5 is in the wait state, the processing shown in this flowchart comes to an end.

When a processing request is received, the control server 5 matches the control data included in the processing request with the system control data held in the control data holding block 6 to search the ID of the bin in which the requested cassette is accommodated (step S5). If the requested cassette is not found, the control server 5 outputs an error message "Cassette not found" (step S6) and the flowchart process goes back to step S4 to wait until another processing request comes. If the requested cassette is found, the control server 5 determines whether the received processing request is "Delete" or not (step S7). If the processing request found is not "Delete," the flowchart process goes to step S8; if the processing request found is "Delete," the flowchart process goes to step S13.

If the request cassette is found and the processing request is other than "Delete," the controller server 5 issues a control directive according to the processing request to the image and/or sound information input/output block 7 and the robotics unit 8 via the LAN 9b and the LAN 9c (step S8). Receiving the control directive from the control server 5, the robotics unit 8 takes the cassette from the bin specified in the control directive and sets the cassettes to the image and/or sound information input/output block 7 (step S9). The image and/or sound information input/output block 7 performs an operation according to the control directive (step S10). To be specific, if the processing request inputted in step S4 is "Reproduce," the image and/or sound information input/output block 7 reproduces the image and/or sound information recorded in the cassette. If the processing is "Record," the image and/or sound information input/output block 7 records image and/or sound information on the cassette. When the processing comes to an end, the image and/or sound information input/output block 7 notifies the control server 5 of "End of processing" via the LAN 9b. Receiving "End of processing," the control server outputs a control directive to the robotics unit 8 via the LAN 9c to move the cassette from the image and/or sound information input/output block 7 to an empty bin (step S11).

Here, the control server 5 determines whether the processing request received in step S4 was "Record" or not (step S12). If the processing request was "Record," the process of this flowchart goes to step S13; if the processing request was not "Record," the process goes back to step S4, and the control server 5 waits until another processing request comes. If the processing request was "Delete" or "Record," the control server 5 updates the control data held in the control data holding block 6 according to the content of the processing request. At the same time, the control server 5 issues a control data update directive to the read/write device via the LAN 9a to update the control data recorded on the IC card attached to the cassette concerned (step S13). When the above-mentioned processing operations all come to an end, the process of this flowchart goes back to step S4 and the control server 5 waits until another processing request comes.

If, in the control data update operation of step S13, the processing request was "Record," the control data of recorded image and/or sound information is written to the IC card. If the processing request was "Delete," the control data recorded on the IC card is deleted.

Figure 3:
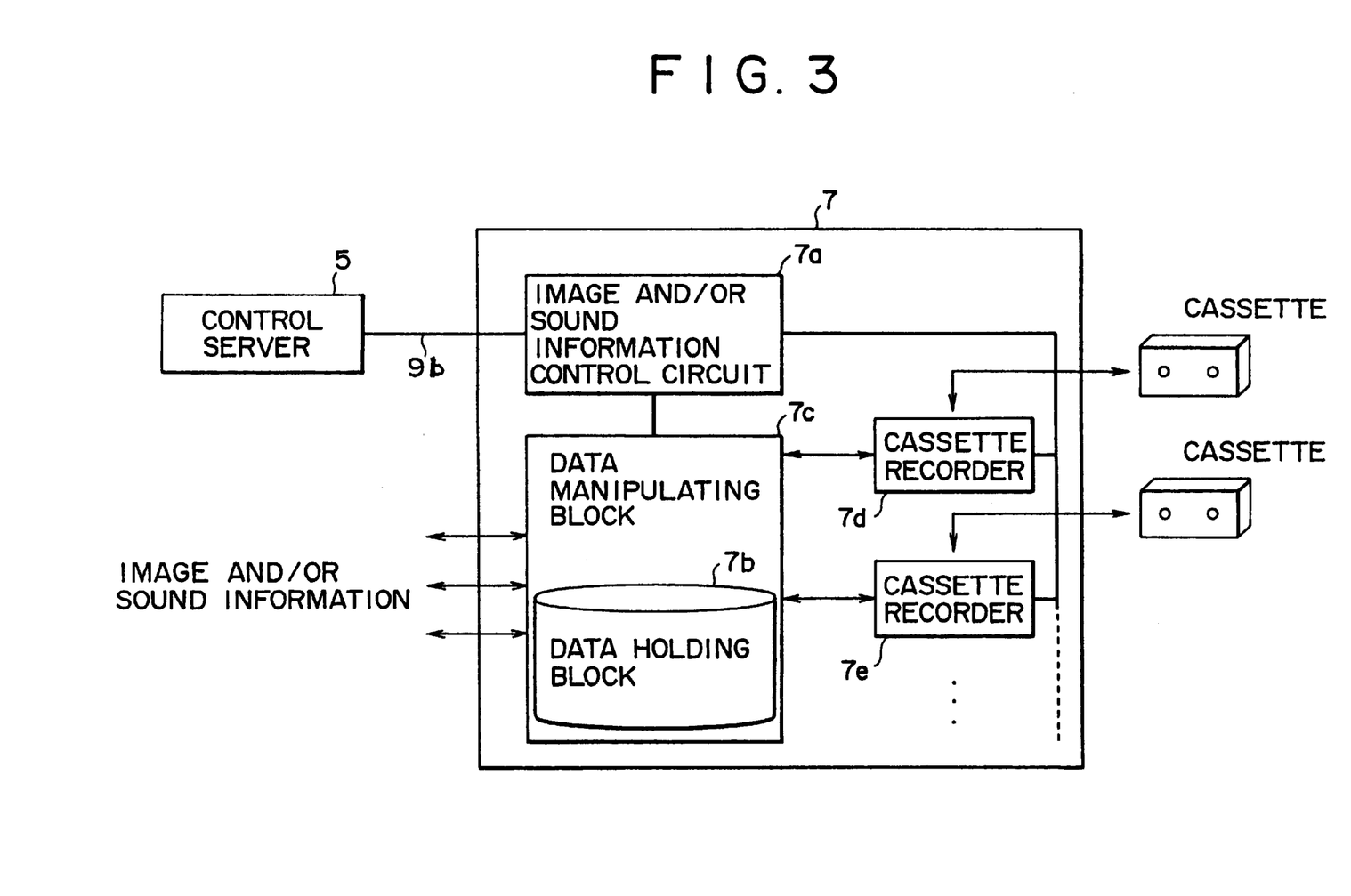
FIG. 3 is a schematic diagram illustrating a principal constitution of an image and/or sound information input/output block shown in FIG. 1.

The following describes an internal constitution of the image and/or sound information input/output block 7.

Referring to FIG. 3, there is shown a schematic diagram illustrating a principle constitution of the image and/or sound information input/output block 7 shown in FIG. 1.

In FIG. 3, the image and/or sound information input/output block 7 is composed of an image and/or sound information control circuit 7a, a data holding block 7b, a data manipulating block 7c, and cassette recorders 7d, 7e, and so on. As described with reference to FIG. 1, the image and/or sound information input/output block 7 is adapted to set a cassette and is connected to the control server via the LAN 9b. Further, the image and/or sound information input/output block 7 has various terminals for transferring image and/or sound information with the outside.

The image and/or sound information control circuit 7a issues a data manipulation directive to the data manipulating block 7c and the cassette recorders 7d, 7e, and so on based on a control directive received from the control server 5 via the LAN 9b.

The data holding block 7b holds image and/or sound information received from the outside or from the cassette recorders 7d, 7e, and so on.

The data manipulating block 7c manipulates, based on a data manipulation directive received from the image and/or sound information control circuit 7a, the image and/or sound information held in the data holding block 7b and outputs the manipulated image and/or sound information to the cassette recorders 7d, 7e, and so on or to the outside.

Based on the data manipulation directive received from the image and/or sound information control circuit 7a, the cassette recorders 7d, 7e, and so on perform an image and/or sound information input/output operation with the cassette concerned.

The following describes a procedure in which the image and/or sound information input/output operation is performed on the cassette concerned by the image and/or sound information input/output block having the above-mentioned constitution.

Figure 4:
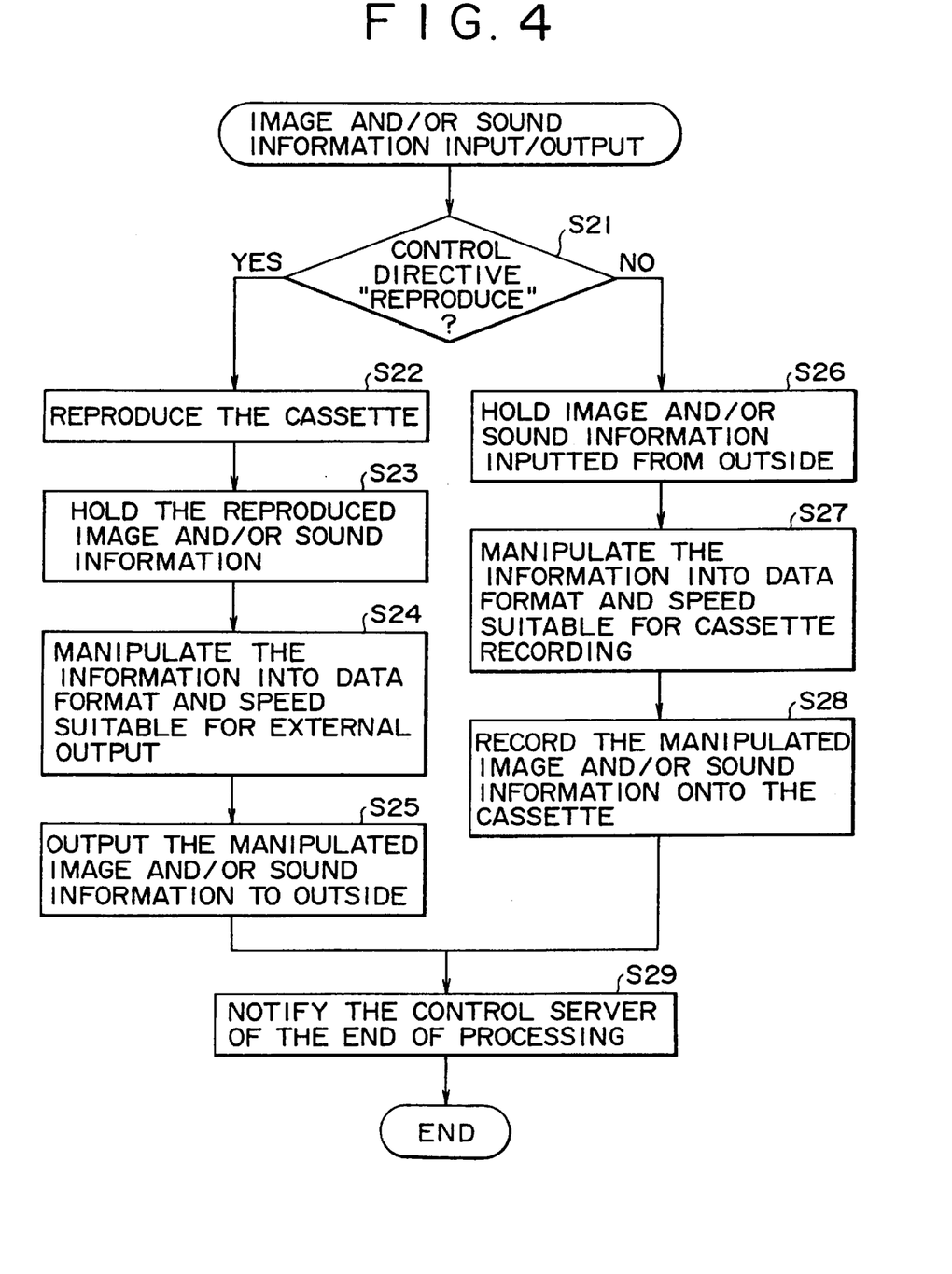
FIG. 4 is a flowchart indicating a procedure of input/output processing by the image and/or sound information input/output block.

Referring to FIG. 4, there is shown a flowchart indicating a procedure in which an image and/or sound information input/output operation is performed.

First, the image and/or sound information control circuit 7a determines whether a control directive received from the control server 5 is "Reproduce" or "Record" (step S21) and issues a data manipulation directive based on the control directive. Here, the processing branches into reproduction processing and record processing.

If the control directive is "Reproduce," the image and/or sound information recorded on the cassette is reproduced by the cassette recorder based on the data manipulation directive issued by the image and/or sound information control circuit 7a (step S22). The reproduced image and/or sound information is temporarily held in the data holding block 7b (step S23) and manipulated into a data format and speed suitable for external output (step S24) to be outputted outside (step S25).

If the control directive is "Record," image and/or sound information inputted from the outside is temporarily held in the data holding block 7b (step S26). The data manipulating block 7c, based on the data manipulation directive issued by the image and/or sound information control circuit 7a, manipulates the image and/or sound information held in the data holding block 7b into a data format and speed suitable for the recording onto the cassette (step S27) and outputs the manipulated information. The cassette recorder, based on the data manipulation directive issued by the image and/or sound information control circuit 7a, records the manipulated image and/or sound information outputted from the data manipulating block 7c onto the cassette (step S28).

When the above-mentioned processing comes to an end, the image and/or sound information control circuit 7a notifies the control server 5 of the end of processing via the LAN 9b (step S29), upon which the processing shown in this flowchart comes to an end.

In the above-mentioned processing, the format and speed of the image and/or sound information to be transferred between the image and/or sound information input/output block 7 and the outside are not limited as long as the form and speed are set to the data manipulating block 7c. If the image and/or sound information inputted from the outside is too large in size to be recorded in one unit of cassette, a plurality of cassette recorders may be used for "Record." In this case, in step S29, end notification includes details of recording status indicating the cassette recorders used for recording, cassette data, and the manner (for example, sequence and type) of distributing the image and/or sound information to the plurality of cassette recorders.

As described, the cassette managing system according to the present invention allows a data read/write operation on the IC card attached to a cassette with same accommodated in its bin. Therefore, storing the control data for a cassette attached to an IC card into the same makes it unnecessary for the cassette to be taken out of its bin for acquiring the ID of the cassette, thereby enhancing the speed of the initialization processing.

Further, the cassette managing system according to the present invention, performs an IC card data read/write operation without touching the IC card, thereby making it unnecessary to provide terminals and so on inside the bin. Namely, if a cassette often taken out of its bin is accommodated in the same slightly out of place, communication between the cassette and its bin is ensured.

Still further, the cassette managing system according to the present invention stores the control data into the IC card, thereby making it unnecessary for the robotics unit to have a hard disk of its own.

Yet further, the cassette managing system according to the present invention controls the cassette managing data and the cassette bin data separately, so that a bin in which a particular cassette is accommodated can be changed to another bin as required.

Figure 5:
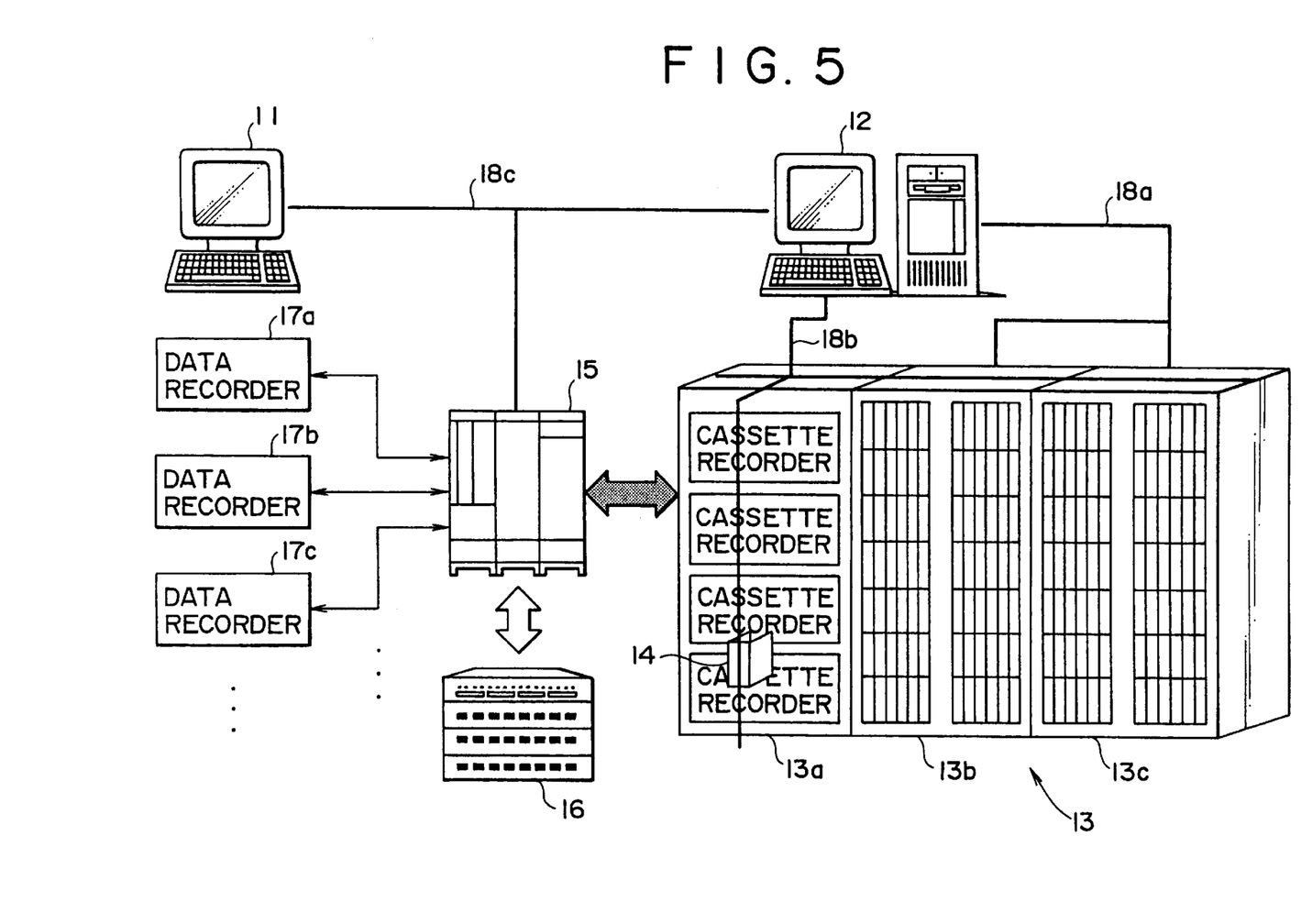
FIG. 5 is a schematic diagram illustrating a constitution of the cassette managing system according to the present invention, practiced as one preferred embodiment thereof.

The following describes a preferred embodiment in which the cassette managing system according to the present invention is applied to cassette tape managing by referring to FIG. 5.

FIG. 5 is a schematic diagram illustrating a constitution of the cassette managing system according to the present invention, practiced as one preferred embodiment thereof.

Now, referring to FIG. 5, the cassette managing system is composed of an operator terminal 11, a control server 12, a library 13, a robotics unit 14, an information processing block 15, a buffer 16, tape recorders 17a, 17b, 17c, and so on, and LANs 18a, 18b, and 18c. The library 13 is composed of a cassette recorder block 13a and silos (a casing for holding a large number of bins) 13b and 13c. The bins accommodated in the silos 13b and 13c each accommodate a cassette tape for recording image and/or sound information.

The server 12 corresponds to the server 5 shown in FIG. 1. The bins accommodated in the silos 13b and 13c of the library 13 correspond to the bins 4a, 4b, 4c, and so on of FIG. 1. The robotics unit 14 corresponds to the robotics unit 8 shown in FIG. 1.

A combination of the cassette recorder block 13a of the library 13, the information processing block 15, and the buffer 16 corresponds to the image and/or sound information input/output block 7 of FIG. 1.

Namely, the cassette recorders arranged in the cassette recorder block 13a correspond to the cassette recorders 7d, 7e, and so on shown in FIG. 3, the information processing block 15 corresponds to the image and/or sound information control circuit 7a and the data manipulating block 7c shown in FIG. 3, and the buffer 16 corresponds to the data holding block 7b.

It should be noted that the tape recorders 17a, 17b, 17c, and so on correspond to the "outside" described with reference to FIG. 3. The LANs 18a, 18b, and 18c correspond to the LANs 9a, 9b, and 9c shown in FIG. 1. FIG. 5 shows two silos (13b and 13c) and four cassette recorders; but these numbers may be changed according to the scale of the system. When the number of silos grows, a server for controlling control data of each of the silos may be arranged below the control server 12.

In the cassette managing system thus constituted, the control server 12 controls the cassette tapes accommodated in the silos 13b and 13c. Each of the cassette tapes is attached to an IC card having a storage area in which control data for controlling the cassette tape is stored.

Figure 6:
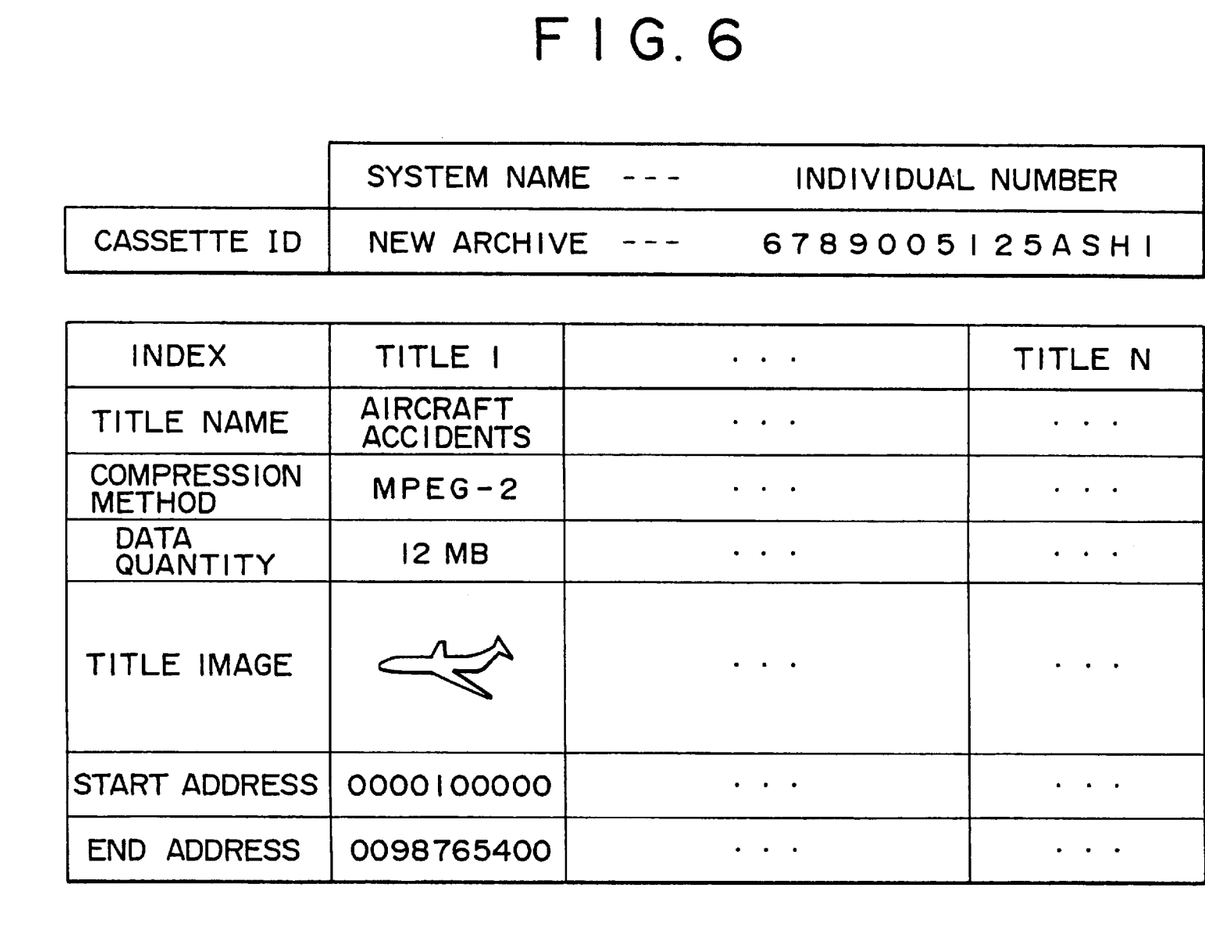
FIG. 6 is a diagram illustrating a specific example of control data stored in an IC card.

The following describes a specific example of the control data to be stored in each IC card.

Referring to FIG. 6, there is shown a specific example of the control data to be stored in the IC card.

The cassette tape control data to be stored in the IC card is largely divided into "cassette ID" and "index."

The "cassette ID" is composed of a "system name" and an "individual number" of a cassette tape. In this example, the cassette tape system name is "new archive" and individual number is "6789005125ASHI."

The "index" includes detailed control data of each of a plurality of pieces of image and/or sound information recorded on that cassette tape. In this example, a "title name," a "compression method," a "data quantity," a "title image," a "start address," and an "end address" are included. In the example of this control data, "title 1" has title name "aircraft accidents," the compression method "MPEG-2," data quantity "12 MB," title image "image of aircraft," start address "0000100000," and end address "0098765400."

It should be noted that, for the control data included in the index, items other than mentioned above may be set as required by the operation of the cassette managing system.

Referring to FIG. 5 again, when a search operation is activated from the operator terminal 11 for image and/or sound information that should be stored in the library 13, the control server 12 searches a database controlled by the same for the image and/or sound information matching a search condition and supplies the obtained image and/or sound information to the operator terminal 11 via the LAN 18a. The search condition may be combined with other conditions; for example, the system name is "new archive" and the title name is "aircraft."

If the operator terminal 11 requests reproduction of the image and/or sound information from a cassette tape or recording of image and/or sound information to the same, the control server 12 performs processing according to the request in the procedure shown in FIG. 2.

In the cassette managing system having the above-mentioned constitution, data can be read from an IC card to the cassette tape attached with that IC card accommodated in a bin in the silo or data can be written to the IC card with the cassette tape accommodated in the bin in the silo. This novel constitution enhances the speed of the initialization processing, thereby significantly reducing the time up to request acceptance in the initial system operation.

Further, as the IC card read/write operations are performed without touching the IC cards, no connectors and the like need be provided inside the bins. Namely, if a cassette often taken out of its bin is accommodated in the same slightly off place, communication between the cassette and its bin is ensured. Therefore, the control accuracy of the robotics unit need not be enhanced, thereby reducing the processing time and simplifying the control mechanism.

Still further, because the control data of each cassette tape is stored in an IC card attached thereto, the robotics need not have a hard disk of its own, thereby simplifying the constitution of the robotics unit.

Moreover, the cassette control data and the bin ID are controlled separately, so that a bin in which a particular cassette tape is accommodated can be changed to another bin as required. Hence, a frequently used cassette may be arranged near the cassette recorder, thereby enhancing the processing efficiency.

In the description above, IC card read/write operations are performed by the read/write device provided on each bin. It will be apparent that each bin is provided with only a reading device and each cassette recorder is provided with an IC card writing device; in the "record" mode or the "delete" mode, the control data may be written/deleted to/from the IC card by the cassette recorder.

The means for communication between the read/write device and the IC card may be any means that ensures non-contact communication; for example, electromagnetic or optical means may be used. In addition, magnetic coupling or electrostatic coupling may be used.

In the above description, cassette tapes attached to IC cards are managed. It will be apparent that discs attached with IC cards may also be managed, for example. The cassette size and the information recording method (optical, magnetic, or magneto-optical, for example) are not limited to the above-mentioned preferred embodiments of the invention.

It will also be apparent that, instead of managing cassettes attached to IC cards, cassettes with IC cards assembled in their cassette shells during the fabrication process may be managed.

As described and according to the present invention, a read/write device for reading control data from the IC card attached to each cassette or writing control data thereto without touching the IC card is arranged on a bin in which the cassette is accommodated. This novel constitution allows a control data read/write operation with the cassette accommodated in its bin, thereby speeding up initialization processing. Because communication between the IC card and the read/write device is performed in a non-contact manner and there is no cassette accommodating position allowable range, the control mechanism of the robotics unit can be simplified. Moreover, the cassette managing data and the bin information are controlled separately, so that a bin in which a particular cassette is accommodated can be changed to another bin as required, thereby simplifying the operation for arranging cassettes.

While the preferred embodiments of the present invention have been described using specific terms, such description is for illustrative purposes only, and it is to be understood that changes and variations may be made without departing from the spirit or scope of the appended claims.

What is claimed is:

1. A cassette managing system for managing cassettes for recording image and/or sound information, comprising:

cassette accommodating means for accommodating a cassette attached at a card attaching position thereof to an integrated circuit card having an information storage area, said cassette accommodating means having a read/write device for reading data from said integrated circuit card and for writing data to said integrated circuit card without touching said integrated circuit card while said cassette is accommodated in said cassette accommodating means;

a control server for generating system control data based on the data read from said integrated circuit card by said read/write device, said system control data including cassette managing data read from said integrated circuit card and identification data for identifying said cassette accommodating means in which said cassette is accommodated, wherein said cassette managing data and said identification data are separately controlled to allow a change of said cassette accommodating means in which said cassettes are accommodated and, upon receiving a request for processing said cassette accommodated in said cassette accommodating means, for generating a control directive from said system control data and said request for processing and outputting said control directive;

image and/or sound information input/output means for reproducing image and/or sound information from said cassette and for recording image and/or sound information onto said cassette according to said control directive when said cassette is set for said reproducing and/or recording; and a robotics unit for selecting said cassette according to said control directive and moving the selected cassette to one of said cassette accommodating means and said image and/or sound information input/output means.

2. The cassette managing system as set forth in claim 1, wherein said integrated circuit card stores cassette managing data of the cassette to which said integrated circuit card is attached.

3. The cassette managing system as set forth in claim 1, wherein said image and/or sound input/output means comprises:

an image and/or sound information control circuit for outputting a data manipulation directive according to said control directive from said control server;

a cassette recorder for recording image and/or sound information onto said cassette and reproducing image and/or sound information therefrom according to said data manipulation directive;

a data holding block for temporarily holding, according to said data manipulation directive, said image and/or sound information reproduced by said cassette recorder or image and/or sound information inputted from outside said cassette managing system; and a data manipulating block for manipulating said image and/or sound information held in said data holding block, according to said data manipulation directive, and outputting resultant information to one of said cassette recorder and a device outside said cassette managing system.

4. A cassette managing system for managing cassettes for recording image and/or sound information, comprising:

cassette accommodating means for accommodating a cassette assembled at a particular position thereof with an integrated circuit card having an information storage area, said cassette accommodating means having a read/write device for reading data from said integrated circuit card and writing data to said integrated circuit card without touching said integrated circuit card while said cassette is accommodated in said cassette accommodating means;

a control server for generating system control data based on the data read from said integrated circuit card by said read/write device, said system control data including cassette managing data read from said integrated circuit card and identification data for identifying said cassette accommodating means in which said cassette is accommodated, wherein said cassette managing data and said identification data are separately controlled to allow a change of said cassette accommodating means in which said cassettes are accommodated and, upon receiving a request for processing said cassette accommodated in said cassette accommodating means, for generating a control directive from said system control data and said request for processing and outputting said control directive;

image and/or sound information input/output means for reproducing image and/or sound information from said cassette and for recording image and/or sound information onto said cassette according to said control directive when said cassette is set for said reproducing and/or recording; and a robotics unit for selecting said cassette according to said control directive and moving the selected cassette to one of said cassette accommodating means and said image and/or sound information input/output means.

5. A cassette managing system for managing cassettes for recording image and/or sound information, comprising:

cassette accommodating means for accommodating a cassette attached at a particular card attaching position thereof to an integrated circuit card having an information storage area, said cassette accommodating means having a read device for reading data from said integrated circuit card without touching said integrated circuit card while said cassette is accommodated in said cassette accommodating means;

a control server for generating system control data based on the data read from said integrated circuit card by said read device, said system control data including cassette managing data read from said integrated circuit card and identification data for identifying said cassette accommodating means in which said cassette is accommodated, wherein said cassette managing data and said identification data are separately controlled to allow a change of said cassette accommodating means in which said cassettes are accommodated and, upon receiving a request for processing said cassette accommodated in said cassette accommodating means, for generating a control directive from said system control data and said request for processing and outputting said control directive;

image and/or sound information input/output means for reproducing image and/or sound information from said cassette and recording image and/or sound information onto said cassette according to said control directive when said cassette is set for said reproducing and/or recording; and a robotics unit for selecting said cassette according to said control directive and for moving the selected cassette to one of said cassette accommodating means and said image and/or sound information input/output means.

* * * * *